(12) United States Patent
Ge et al.

(10) Patent No.: US 11,413,983 B2
(45) Date of Patent: Aug. 16, 2022

(54) UNITARY VEHICLE ON-BOARD CHARGER AND GENERATOR

(71) Applicant: Ford Global Technologies, LLC, Dearborn, MI (US)

(72) Inventors: Baoming Ge, Okemos, MI (US); Yantao Song, Northville, MI (US); Lihua Chen, Farmington Hills, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 397 days.

(21) Appl. No.: 16/746,784

(22) Filed: Jan. 17, 2020

(65) Prior Publication Data

US 2021/0221249 A1    Jul. 22, 2021

(51) Int. Cl.
| | |
|---|---|
| *B60L 53/00* | (2019.01) |
| *B60L 53/22* | (2019.01) |
| *H02M 3/335* | (2006.01) |
| *H01F 27/38* | (2006.01) |
| *B60L 55/00* | (2019.01) |
| *H02M 1/00* | (2006.01) |

(52) U.S. Cl.
CPC .............. *B60L 55/00* (2019.02); *B60L 53/22* (2019.02); *H01F 27/38* (2013.01); *H02M 3/33584* (2013.01); *H02M 1/007* (2021.05)

(58) Field of Classification Search
CPC ...... B60L 55/00; B60L 53/22; B60L 2210/10; B60L 53/12; B60L 53/14; B60L 2210/30; B60L 2210/40; B60L 53/24; H01F 27/38; H02M 3/33584; H02M 1/007; H02M 7/53871; H02M 1/126; H02M 3/158; H02M 1/4225; H02M 1/14; Y02T 10/70; Y02T 10/92; Y02T 90/14; Y02T 10/7072; Y02T 10/72; Y02E 60/00; Y04S 10/126
See application file for complete search history.

(56) References Cited

U.S. PATENT DOCUMENTS

| | | | |
|---|---|---|---|
| 8,698,354 B2 | 4/2014 | Ghosh et al. | |
| 2015/0214770 A1 | 7/2015 | Chen | |
| 2018/0222333 A1 | 8/2018 | Khaligh et al. | |
| 2019/0202300 A1* | 7/2019 | Pastor | ...................... H02J 7/04 |
| 2019/0359074 A1* | 11/2019 | Kume | ...................... H02P 5/747 |
| 2020/0274375 A1* | 8/2020 | Griffiths | ................ H02J 7/0029 |

* cited by examiner

*Primary Examiner* — Toan T Vu
(74) *Attorney, Agent, or Firm* — David B Kelley; Brooks Kushman P.C.

(57) ABSTRACT

A unitary on-board charger and generator (OBCG) for an electric vehicle system and method is disclosed. The OBCG includes a charging circuit with a diode bridge rectifier connected to an AC power source, a power factor correction converter, and a bi-directional DC/DC converter. The OBCG also includes a generating circuit with a a three-phase inverting circuit, three inductive coils connected to each leg of the three-phase inverting circuit, and a plurality of output capacitors connected to the outputs of the three inductive coils. The OBCG also includes a bridge capacitor and a control switching element connected between the charging circuit and the generating circuit for changing between a charging and generating state.

20 Claims, 7 Drawing Sheets

UNITARY VEHICLE ON-BOARD CHARGER AND GENERATOR

TECHNICAL FIELD

The present disclosure relates to a system and method for a unitary on-board charger and on-board generator used within an electric vehicle, plug-in hybrid electric vehicle, or hybrid-electric vehicle.

BACKGROUND

Vehicles such as battery-electric vehicles (EVs), plug-in hybrid electric vehicles (PHEVs) and fully hybrid-electric vehicles (FHEVs) contain a high-voltage traction battery assembly to act as an energy source for one or more electric machines. The traction battery includes components and systems to assist in managing vehicle performance and operations. The traction battery may be charged through an on-board charger (OBC) which receives energy, e.g., from an electric vehicle service equipment (EVSE) connection. The traction battery may then operate to provide energy through an on-board generator (OBG) to external loads (e.g., computers, electric tools, camping equipment). Generally, the OBC and OBG generally require separate electrical circuitry that increases packaging space and cost.

SUMMARY

A system and method are disclosed for a unitary on-board charger and generator (OBCG) used within an electric vehicle. The OBCG may include a charging circuit and a generating circuit. The charging circuit may include a diode bridge rectifier, a power factor correction converter, and a bi-directional DC/DC converter connected between the filtering capacitor and a traction battery. The power factor correction converter may include a charging inductor coil, a charging solid-state switching element, a charging diode, and a mode switching element parallelly connected to the charging diode.

The generating circuit may include a three-phase inverting circuit that includes a plurality of switching elements (e.g., MOSFET or IGBT transistors). The three-phase inverting circuit may include a first output leg connected to a first inductive coil, a second output leg connected to a second inductive coil, and a third output leg connected to a third inductive coil. A plurality of output filtering capacitors may also be connected to each of the first, second, and third inductive coils. The three-phase inverting circuit may also be connected to the filtering capacitor and the bi-directional DC/DC converter. It is contemplated that the bi-directional DC/DC converter may be shared between the charging and generating circuits. The OBCG may also include a bridge capacitor and a control switching element connected between the charging circuit and the generating circuit.

A controller may operate to controllably select operation between a charging mode or generating mode. For instance, the controller may operate in a charging mode by: (a) disengaging the mode switching element and the control switching element; (b) cycling the charging solid-state switching element at a predetermined frequency; (c) disengaging one or more of the plurality of switching elements; and (d) controlling the bi-directional DC/DC converter to convert an AC energy received by the AC power source to a DC energy that is stored by the traction battery.

The controller may operate in a generating mode to power a single-phase or split-phase load by: (a) engaging the control switching element; and (b) cycling the charging solid-state switching element, the mode switching element, and one or more of the plurality of switching elements to provide a predetermined charging voltage across the bridge capacitor. In response to the controller determining the predetermined charging voltage has been supplied to the bridge capacitor, the controller may also: (a) disengage the charging solid-state switching element and the mode switching element; (b) cycle one or more of the plurality of switching elements; and (c) control the bi-directional DC/DC converter to convert a DC energy stored by the traction battery to a single-phase AC energy or a split-phase AC energy supplied to one or more output loads.

The controller may operate in a generating mode to power a three-phase load by: disengaging the mode switching element, charging solid-state switching element, and the control switching element; (b) cycling one or more of the plurality of switching elements; and (c) controlling the bi-directional DC/DC converter to convert a DC energy stored by the traction battery to a three-phase AC energy that is supplied to one or more output loads.

It is contemplated that the plurality of switching elements and the charging solid-state switching element may be designed using IGBT transistors or MOSFET transistors. It is also contemplated that the AC power source may be designed using an electric vehicle supply equipment and the AC power source may be provided to the electric vehicle using a wired connection or a wireless connection.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
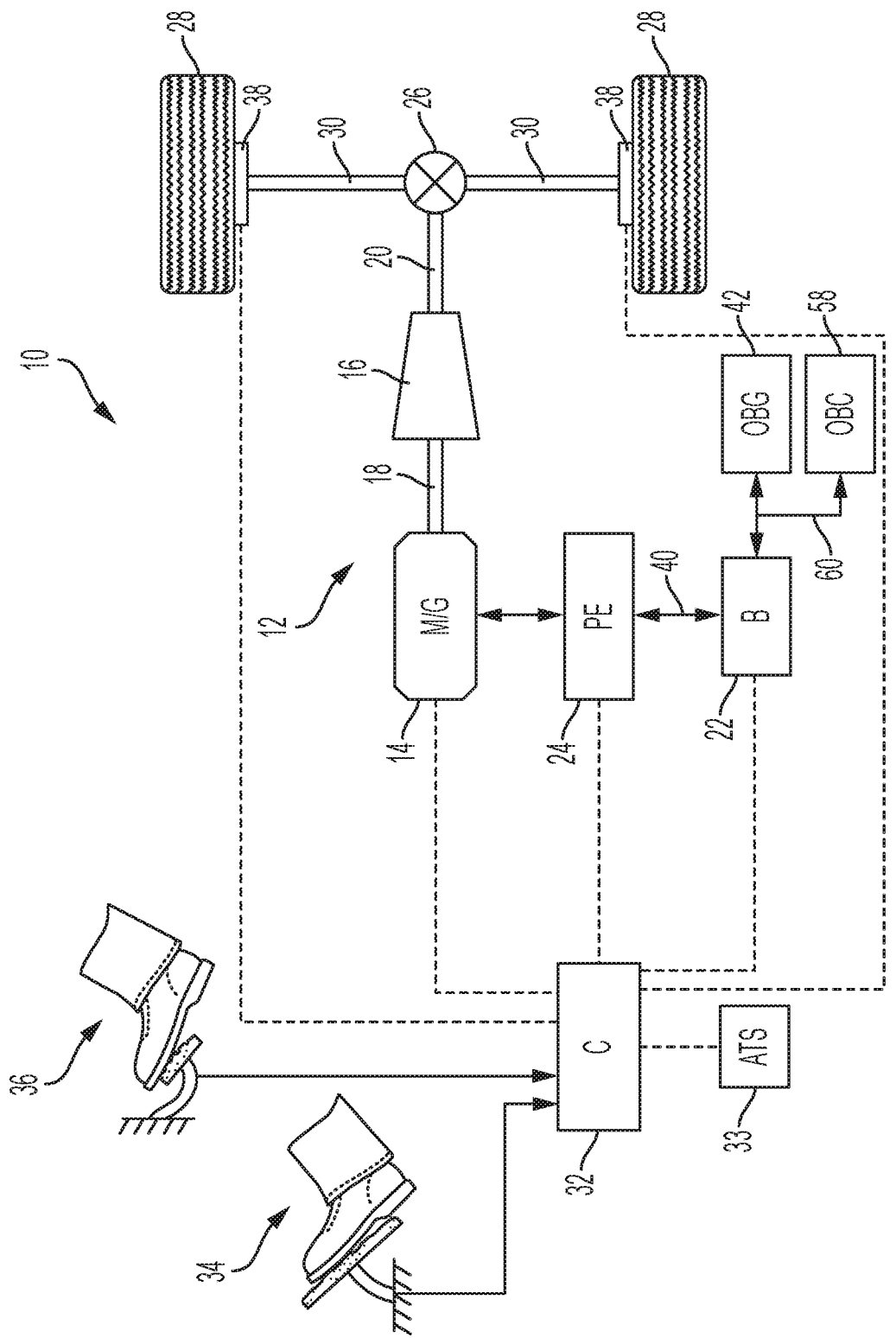
FIG. 1 illustrates an exemplary topology of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an M/G 14 (i.e., electric motor/generator) that drives a transmission 16 (or gearbox). More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated battery 22 (i.e., high voltage battery) is configured to deliver electrical power to or receive electrical power from the M/G 14. Depending upon the type of electric vehicle 10, the size of the battery 22 may vary. For instance, the electric vehicle 10 may be configured such that the battery 22 may be sized to provide 400-Volts or 800-Volts.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the output shaft 20 and the input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the operating mode or condition.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the controller 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16). Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, slowing or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interruptdriven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular strategy being used. Similarly, the order of processing is not necessarily required to achieve the features and advantages described within this specification but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the application. When implemented in software, the control logic may be provided in one or more computer-readable storage devices or media having stored data representing code or instructions executed by a computer to control the vehicle or its subsystems. The computer-readable storage devices or media may include one or more known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

The vehicle 10 also includes an OBG 42 (i.e., on-board generator) that is connected to the wiring 60 which may be a high-voltage DC bus 60. The OBG 42 may be configured to convert the DC energy provided by the traction battery 22 to an AC energy that is compatible for powering external loads. For example, the OBG 42 may provide AC energy to power computers, electric tools (i.e., power saw), or camping equipment. It is also contemplated that the OBG 42 may be configured to provide AC energy compatible with the auxiliary power system such as common wall voltages of 120 VAC and/or 240 VAC. The OBC (i.e., on-board charger) 58 is connected to battery 22 through wire 60.

It is contemplated that the schematic illustrated in FIG. 1 is merely representative and is not intended to be limiting. Other configurations are contemplated without deviating from the scope of the disclosure. It is also contemplated that the vehicle configuration described is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas-powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

Figure 2A:
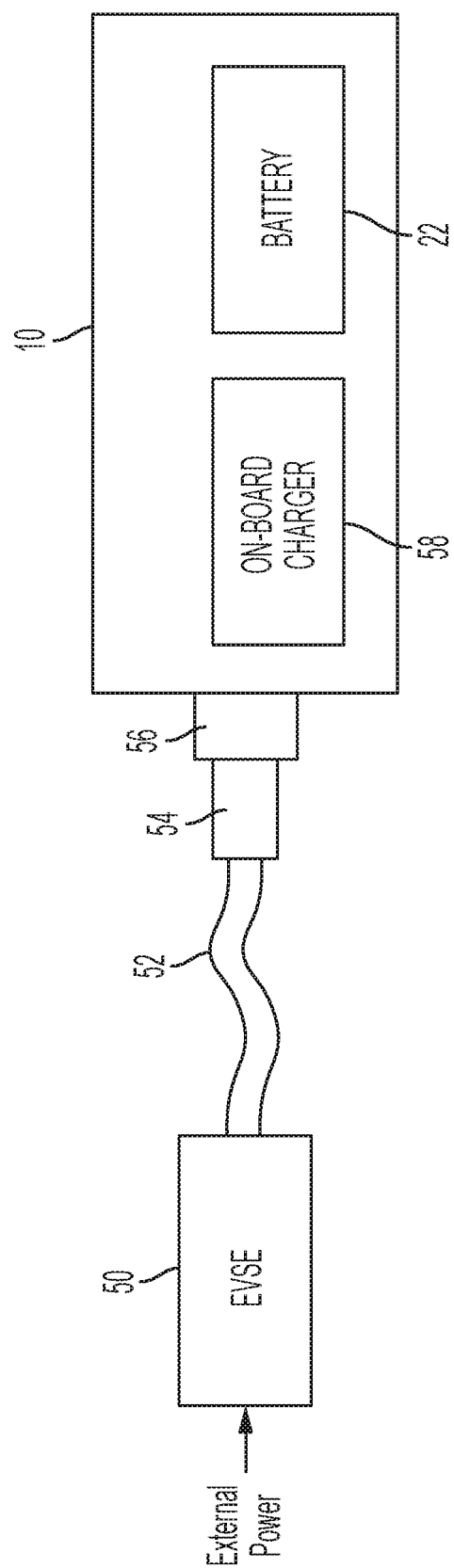
FIGS. 2A and 2B illustrate exemplary topologies of a charging system for the electric vehicle.

FIG. 2A illustrates an arrangement for charging the battery 22 from an external power source (e.g., AC outlet, battery pack, generator). The external power source may be an electrical power distribution network or grid as provided by an electric utility company. As shown, the external power source may be electrically coupled to a charger or EVSE 50 (i.e., electric vehicle supply equipment). Although the EVSE 50 is shown external to electric vehicle 10, it is also contemplated that EVSE 50 may be located within electric vehicle 10.

The EVSE 50 may receive and transfer the received electrical power through a cord 52 and connector 54 that plugs into a mating of the inlet 56 on the electric vehicle 10. As one example, the external power may be AC power received an outlet that is converted to DC power by an OBC 58 (i.e., on-board charger) located within the electric vehicle 10. The OBC 58 may then operate to charge the battery 22. Alternatively, the on-board charger 58 may be located in the EVSE 50 external to the electric vehicle 10.

It is contemplated that the EVSE 50 may be realized in different mechanical configurations including a vehicle charger, a charging station, or a charger. It is also contemplated that the EVSE 50 may be installed as wall-mounted units in a garage or alongside a building where vehicles typically park. The EVSE 50 may be a cord set which is sometimes referred to as a travel charger, portable charger, or handheld charger.

The connector 54 and inlet 56 may utilize a conductive connection in which the electrical conductors in one connector make physical contact with the electrical conductors in the other connector. However, it is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

Figure 2B:
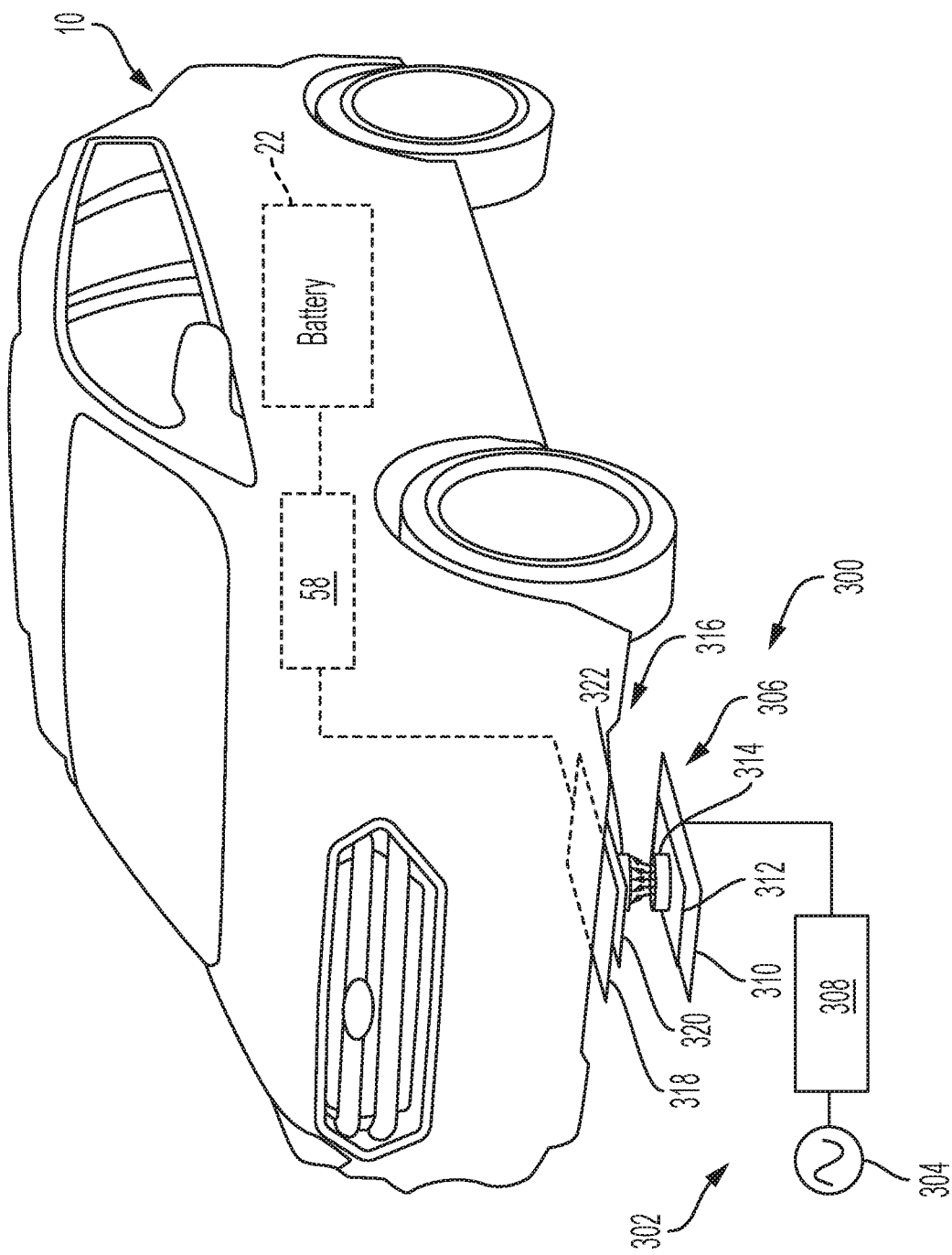

FIG. 2B illustrates a WPT system 300 (i.e., wireless power transfer system) in accordance with one or more embodiments. The WPT system 300 may also include OBC 58 that is operable to charge the battery 22 within the electric vehicle 10. An external charging subsystem 302 may include a power source 304 and a ground coil assembly 306. The power source 304 may represent a conventional alternating current (AC) electrical power distribution network or grid as provided by an electric utility company, according to one or more embodiments. An external circuit 308 may connect the power source 304 to the ground coil assembly 306, and includes components for conditioning (e.g., rectifying, inverting, converting and storing) the power signal that is provided to the ground coil assembly 306. The ground coil assembly 306 may include a plate 310 that is mounted to an underlying surface, e.g., a garage floor, and typically formed of aluminum. The ground coil assembly 306 may also include an inductor with a core 312 and a primary coil 314 (i.e., transmitter coil).

A vehicle coil assembly 316 may be mounted to the electric vehicle 10, and the OBC 58 may operate to condition (e.g., rectify and convert) the power that is provided to the battery 22. The vehicle coil assembly 316 may also include a plate 318 that is mounted to an underside of the electric vehicle 10, and typically formed of aluminum. The vehicle coil assembly 316 may also include an inductor with a core 320 and a coil 322 (i.e., secondary or receiver coil).

The vehicle coil assembly 316 may align with the ground coil assembly 306 for receiving electrical power. The power source 304 may supply the primary coil 314 with a current which establishes a magnetic field (not shown) about the primary coil 314. The secondary coil 322 may be electromagnetically coupled to the primary coil 314, by aligning the vehicle coil assembly 316 with the ground coil assembly 306 and placing the secondary coil 322 within the magnetic field. This magnetic field induces a current in the secondary coil 322 to wirelessly transfer power for inductively charging the battery 22. Inductive charging does not require physical contact between the primary coil 314 and the secondary coil 322. However, the primary coil 314 and the secondary coil 322 should be generally close in proximity to each other for efficient inductive charging.

Figure 3:
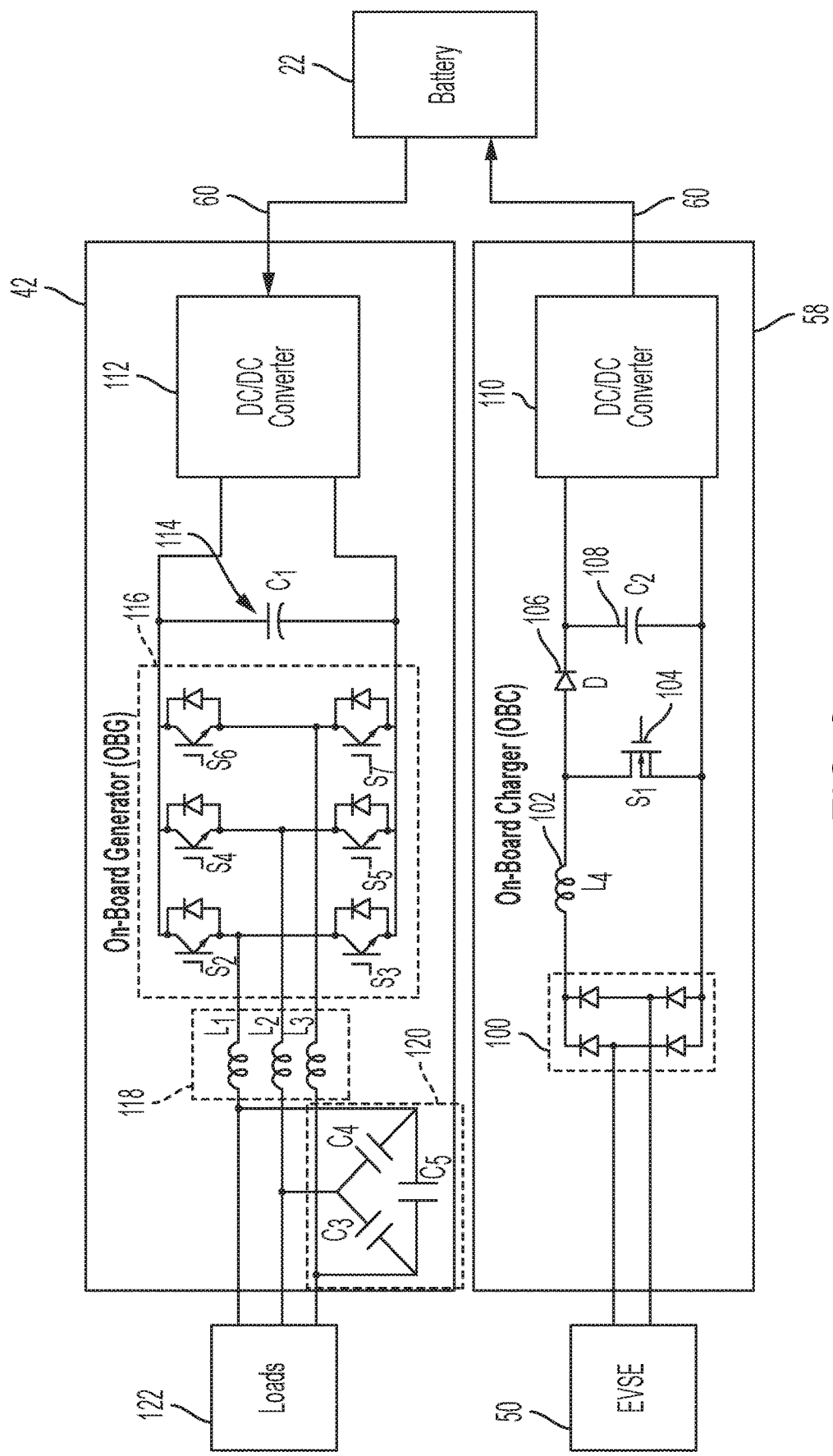
FIG. 3 illustrates a circuit design for a separate on-board charger (OBC) and on-board generator (OBG).

FIG. 3 illustrates a schematic diagram of the OBG 42 and OBC 58. Again, external power may be supplied to OBC 58 through an EVSE 50 connection. The OBC 58 may include a diode bridge rectifier 100 and a first filter capacitor 108 for converting the AC energy to a DC energy. It is also contemplated that the OBC 58 may include a power factor correction (PFC) converter that may generally include an inductive coil 102, a solid-state switching element 104 and a forward-facing diode 106.

The PFC converter may be controlled the solid-state switching element 104. For instance, element 104 may be driven between an ON and OFF state by a control circuit (e.g., controller 32) at a given frequency. When driven to an ON state (i.e., switch closed), a current through inductive coil 102 may increase. When driven to an OFF state (i.e., switch opens), a current through inductive coil 102 may decrease and release all or portion of accumulated energy through diode 106. By adjusting the duty cycle, the unity power factor (PF) may be achieved to control the amount of current being drawn. The OBC 58 may further include a first DC/DC converter 110 (i.e., isolated DC/DC converter) for adjusting the DC-voltage to a desired level. For instance, traction battery 22 may be designed to operate between 400 VDC to 800 VDC. The first DC/DC converter 110 may be designed to boost the DC voltage to the desired level (e.g., 400 VDC) for use by the traction battery 22.

The OBG 42 may likewise include separate circuitry for converting the energy stored within the traction battery 22 (e.g., 400 VDC) to output an AC voltage that can be used to power external loads 122 (e.g., power tools). The OBG 42 may include a second isolated DC/DC converter 112 and a second filter capacitor 114. The OBG 42 may also include a three-phase inverter circuit 116 having a plurality of switching elements that may be designed using insulated gate bipolar transistors (IGBT) or MOSFET transistors. One or more inductive coils 118 and capacitors 120 may operate as a filtering circuit to generate the desired voltage with output frequency (e.g., 60 Hz) desired by the output loads 122. It is contemplated that the second isolated DC/DC converter 112 may operate to adjust the voltage of the traction battery 22 to a level suitable for conversion by the three-phase inverter circuit 116. It is also contemplated that the OBG 42 may operate to convert the DC voltage of traction battery 22 to a three-phase, single-phase, or split-phase voltage depending on the needs of the external loads.

As described, both the OBG 42 and OBC 58 require: (a) a first isolated DC/DC converter 110 and a second isolated DC/DC converter 112; and (b) a first filter capacitor 108 and a second filter capacitor 114. These electrical components may be needed to buffer double line-frequency power and limit voltage ripple within a desired operating voltage and current range. It is contemplated, however, that the overall component number, volume, and cost are increased within a single vehicle and across an entire product line. Furthermore, capacitor 108 and capacitor 114 may be large even though they are designed using electrolytic capacitors that are generally with a potentially limited lifetime durability.

Figure 4:
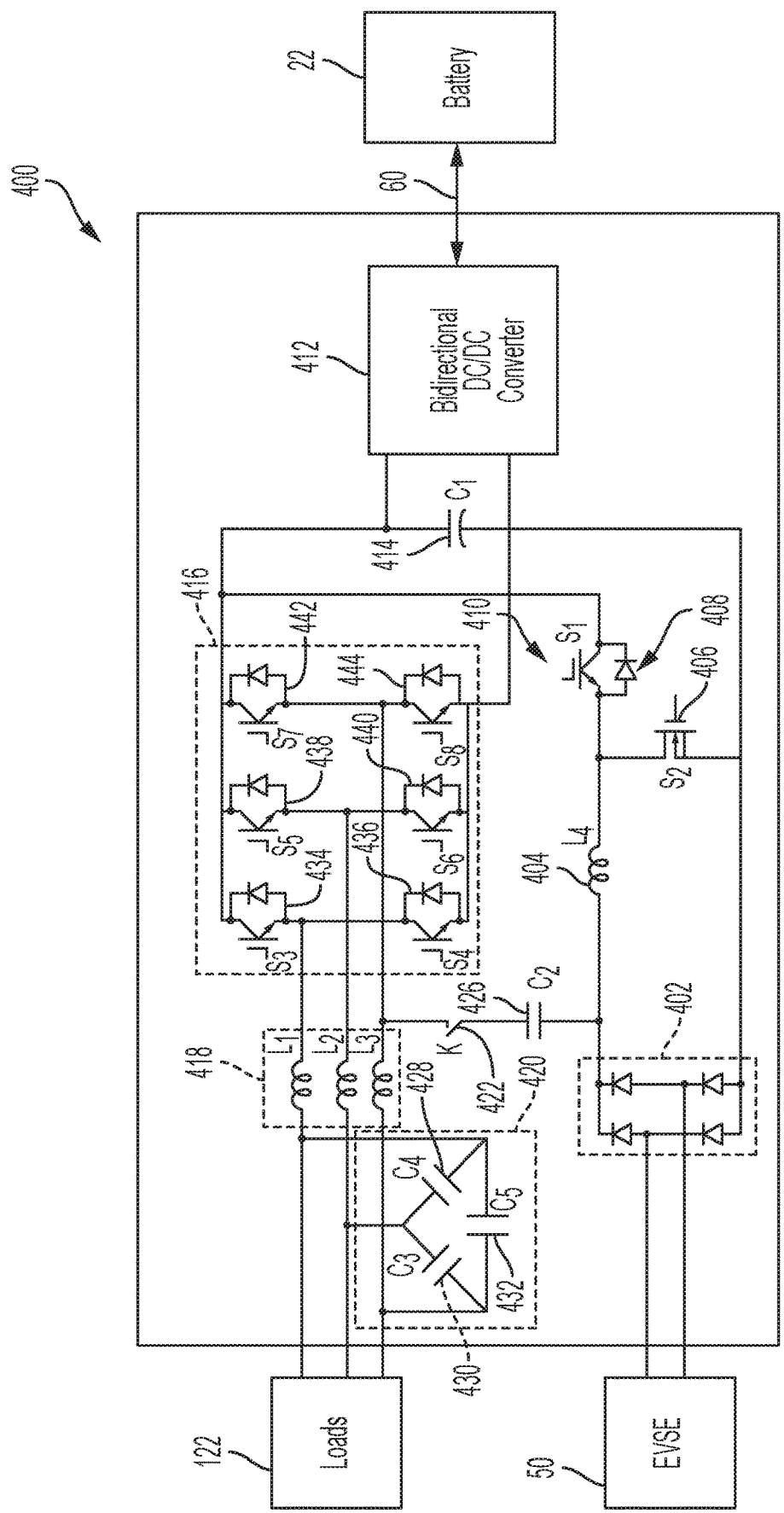
FIG. 4 illustrates a circuit design for a unitary on-board charger and generator (OBCG).

FIG. 4 illustrates an integrated OBCG 400 according to one embodiment. It is contemplated that OBCG 400 may provide the same functionality of the individual OBC 58 and OBG 42 but allow for a reduction in component cost (both per vehicle and across vehicle lines), lower packaging size (e.g., due to the reduction in components needed) and a reduction in cost.

As shown, OBCG 400 may include a diode bridge rectifier 402 and a filter capacitor 414 for converting the AC energy to a DC energy. It is also contemplated that the OBC 58 may include a power factor correction (PFC) converter that may generally include an inductive coil 404, a solid-state switching element 406 and a forward-facing diode 408, and a solid-state switching element 410. The OBC 58 may further include a bi-directional DC/DC converter 412 for adjusting the DC-voltage to a desired level (e.g., 400 VDC) for use by the traction battery 22.

The OBCG 400 42 may also include additional circuitry for converting the energy stored within the traction battery 22 (e.g., 400 VDC) to output an AC voltage that can be used to power external loads 122 (e.g., power tools). The OBCG 400 may operate the bi-directional DC/DC converter 412 to adjust the DC voltage of battery 22 to a desired level. The filtering capacitor 414 may operate to filter the DC voltage before being provided to a three-phase inverter circuit 416 that includes a plurality of switching elements that may be designed using insulated gate bipolar transistors (IGBT) or MOSFET transistors. One or more inductive coils 418 and capacitors 420 may operate as a filtering circuit to generate the desired voltage with output frequency (e.g., 60 Hz) desired by the output loads 122. It is contemplated that the bi-directional DC/DC converter 412 may operate to adjust the voltage of the traction battery 22 to a level suitable for conversion by the three-phase inverter circuit 416. It is also contemplated that the OBCG 400 may operate to convert the DC voltage of traction battery 22 to a three-phase, single-phase, or split-phase voltage depending on the needs of the external loads.

As shown, the OBCG 400 may only require a single isolated bidirectional DC/DC converter 412 and a smaller DC bus filtering capacitor 414. To reduce size of capacitor 414, a second capacitor 426 may be included to buffer double line-frequency power. It is also contemplated that the OBCG 400 may be operable using film capacitors to increase the lifetime operability.

It is contemplated that switch 422 and switch 410 that may allow OBCG 400 the capability of providing various operating modes. For instance, OBCG 400 may operate in a first operating mode (i.e., MODE I) where the battery 22 is charged using AC power supplied by the EVSE 50. The AC power may be converted to a DC power for charging the battery 22 using the power factor correction (PFC) converter (i.e., inductor 404, switch 406, and diode 408) and the bi-directional DC/DC converter 412. To operate in MODE I, the OBCG 400 controls switch 422 to an open or disengaged state. It is contemplated that switch 422 may be controlled manually or by control signals sent from controller 32.

It is further contemplated that during MODE I, charging of battery 22 may be achieved by controlling the duty cycle of switch 406 (i.e., opening and closing) while switch 410 is controlled to an OFF or disengaged state. The OBCG 400 may also buffer the double line-frequency power through filter capacitor 428 by controlling switches 434, 436, 438, and 440 (i.e., switches S3, S4, S5, S6). At the same time OBCG 400 may also control switches 442, 444 (i.e. S7 and S8) in an OFF or disengaged state. It is contemplated that the DC-bus capacitor voltage may have no double line-frequency ripple, thereby allowing capacitor 414 to be reduced in size.

The OBCG 400 may also operate in a second operating mode (i.e., MODE II) where the battery 22 is used to delivery AC power to the output loads 122. It is contemplated that OBCG 400 may deliver the AC power to a single-phase and/or split-phase output loads 122. In MODE II, the battery 22 may provide energy to accessory loads using the bi-directional DC/DC converter 412 and the DC/AC inverter (i.e., filtering capacitor 414 and three-phase inverter circuit 416). In MODE II, the OBCG 400 (or controller 32) may control switch 422 to a closed or engaged position so that the capacitor 426 buffers double line-frequency power through controlling switches 410, 406, 442, and 444 (i.e., S1, S2, S7, S8). the OBCG 400 (or controller 32) may provide single-phase and/or split-phase output power by controlling switches 434, 436, 438, 440, 442, and 444 (i.e., S3, S4, S5, S6, S7, and S8). It is contemplated that while operating in MODE II, the double line-frequency power may be buffered through capacitor 426 such that the voltage of capacitor 414 has no low frequency ripple thereby allowing capacitor 414 to be reduced in size.

The OBCG 400 may also operate in a third operating mode (i.e., MODE III) where the battery 22 is used to delivery three-phase power to the output loads 122. It is contemplated that while providing three-phase power there may not be double line-frequency power on the high-voltage DC bus of capacitor 414. When the OBCG 400 is operating in MODE III, the switch 422 may be controlled to a disengaged or opened position. Switches 410, 406 (i.e., S1 and S2) may also be controlled to a disengaged or OFF state. The OBCG 400 may further control switches 434, 436, 438, 440, 442, and 444 (i.e., S3, S4, S5, S6, S7, and S8) to provide the three-phase electrical energy. the voltage of capacitor 414 has no low frequency ripple thereby allowing capacitor 414 to be reduced in size.

Figure 5:
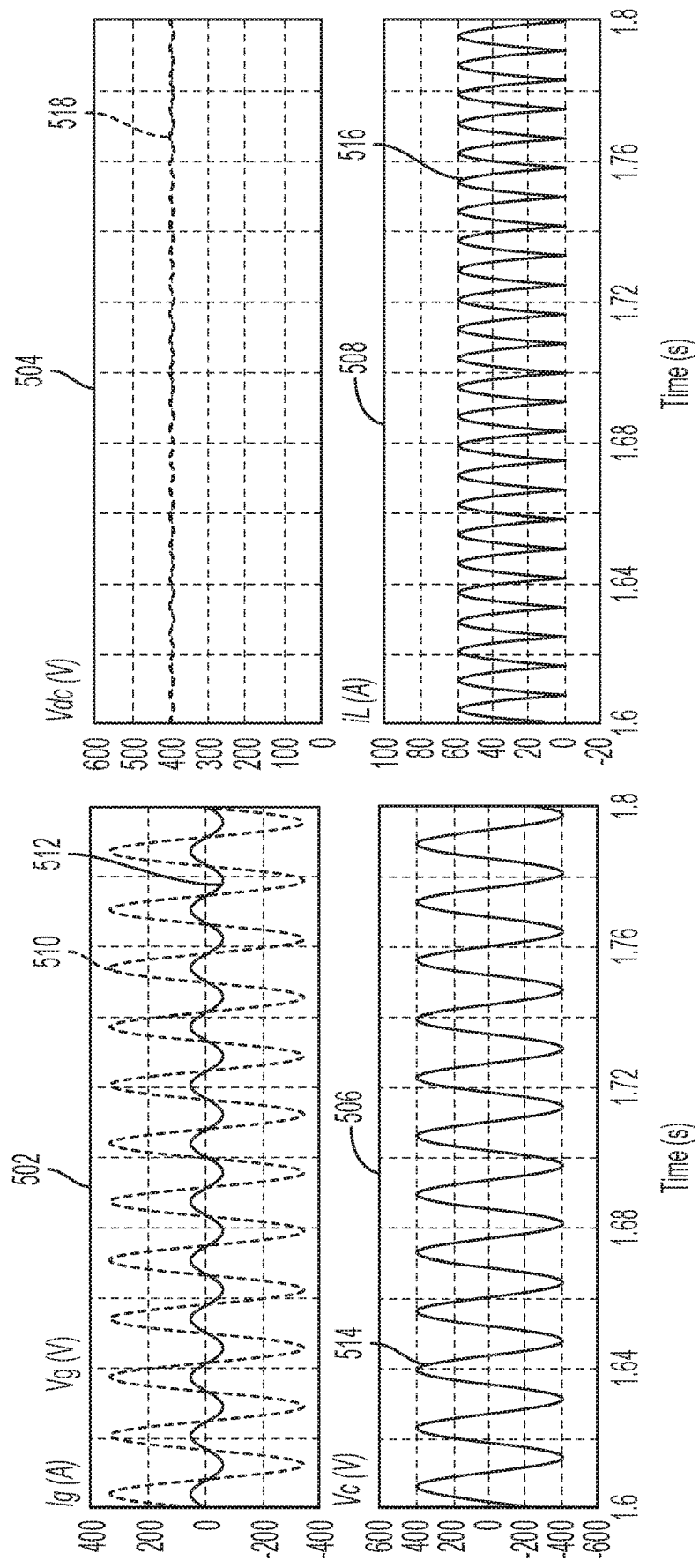
FIG. 5 illustrates a series of graphs illustrating the voltage and current when the unitary OBCG is operating.

FIG. 5 illustrates a series of simulation graphs 502-508 showing the voltage or current while OBCG 400 is operating in MODE I. It is contemplated that the capacitor 414 may be sized as being 400 μF and capacitor 426 may be sized as being 165 μF.

Plot 510 illustrates a 240 $V_{rms}$ AC single-phase grid voltage provided by the EVSE 50 for charging the battery 22 with a power of approximately 10 kiloWatts. Plot 512 also illustrates an approximately 41.7 $A_{rms}$ grid current (Ig) that is in-phase with the grid voltage (Vg) illustrated by plot 510. It is contemplated that during this simulation, there may not be output loads 122.

Plot 514 illustrates the voltage through capacitor 428 (i.e., C4) has an AC-voltage with a 400 Volt peak and a 60 Hz frequency to buffer double line-frequency power. As a result, the high voltage DC bus voltage of capacitor C1 414 may be constant with negligible ripple even if the DC bus capacitance is 400 μF. Plot 516 illustrates the current through inductor 404 ($i_L$) when the PFC is operating. Plot 518 illustrates that the supplied DC-voltage of capacitor C1 414 to charge the battery 22 is approximately 400 Volts.

Figure 6:
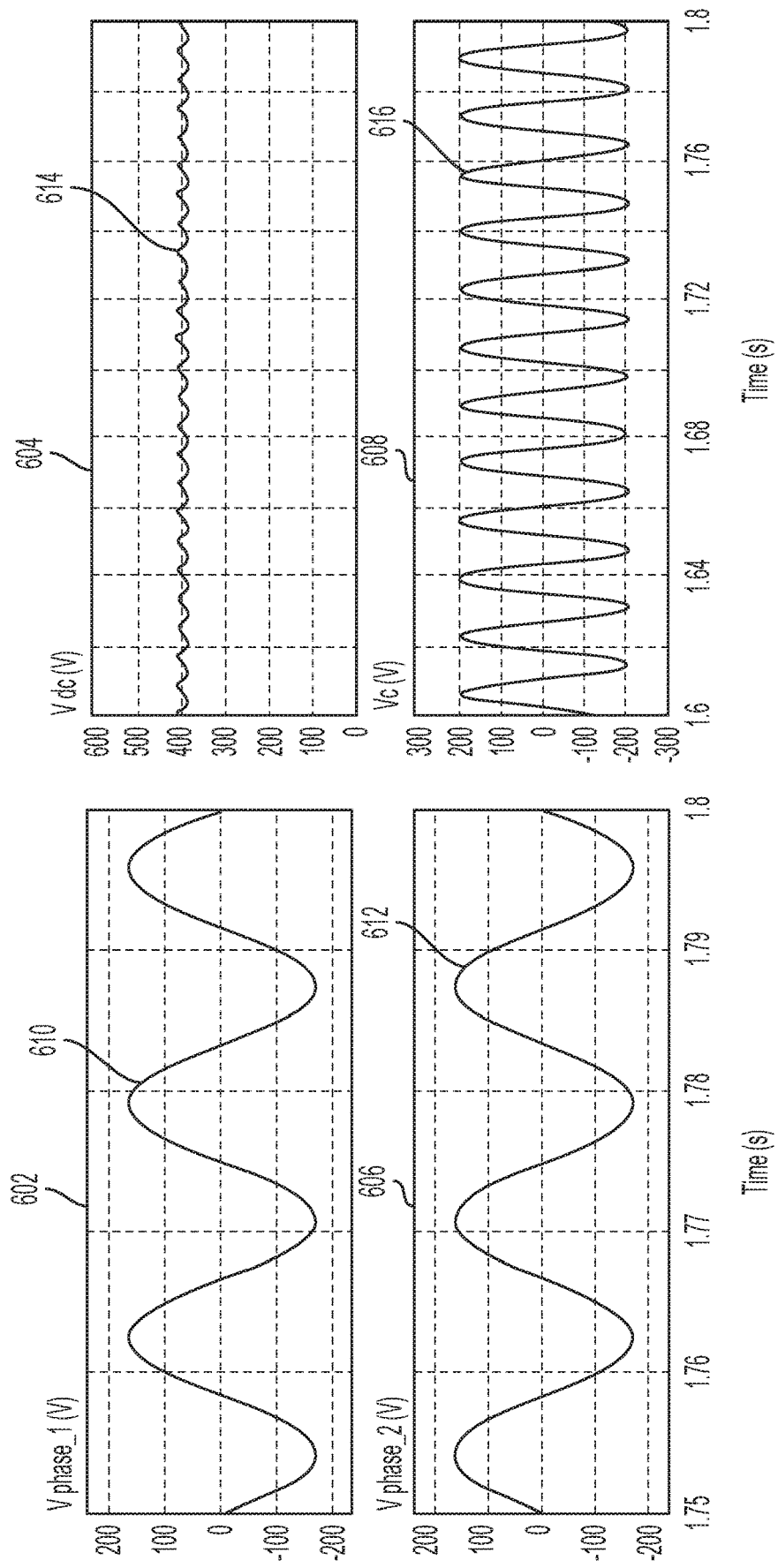
FIG. 6 illustrates another series of graphs illustrating the voltage and current when the unitary OBCG is operating.

FIG. 6 illustrates a series of simulation graphs 602-608 showing the voltage or current while OBCG 400 is operating in MODE II. It is again contemplated that the capacitor 414 may be sized as being 400 μF and capacitor 426 may be sized as being 165 μF. Also, a split-phase output load may be attached for receiving a split-phase voltage of 120 $V_{rms}$. The OBCG 400 may be also operated to support a split-phase output load requiring 5 kW power.

Graph 602 and graph 606 illustrate the split-phase voltages $V_{phase\_1}$ and $V_{phase\_2}$ as plot 610 and plot 612, respectively. As shown by plot 616, the capacitor 426 may operate to buffer double line-frequency power through a 60 Hz AC voltage with 200 Volts peak. It is therefore contemplated that the voltage on the DC bus of capacitor 414 may be constant with ignorable ripple even though DC bus capacitance may be approximately 400 μF.

FIGS. 5 and 6 illustrate that the OBCG 400 may employ a single 400 μF capacitor (i.e., capacitor 414) and one 165 μF capacitor (i.e., capacitor 426) to maintain a constant DC bus voltage with ignorable ripple regardless what single-phase/split-phase load consumes 5 kW power or single-phase grid charges battery with 10 kW power. It is contemplated, however, that an 8000 μF capacitor (i.e., capacitor 108) and a 4000 μF capacitor (i.e., capacitor 114) may be required to achieve the same purpose if a separate OBC 58 and OBG 42 is employed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A unitary on-board charger and generator for an electric vehicle, comprising:
   a charging circuit including:
   a diode bridge rectifier connected to an AC power source,
   a power factor correction converter connected between the diode bridge rectifier and a filtering capacitor, and
   a bi-directional DC/DC converter connected between the filtering capacitor and a traction battery,
   a generating circuit including:
   a three-phase inverting circuit having a first output leg, a second output leg, and a third output leg, the three-phase inverting circuit being connected to the filtering capacitor and the bi-directional DC/DC converter,
   a first three-phase inductive coil connected to the first output leg, a second three-phase inductive coil connected to the second output leg, and a third three-phase inductive coil connected to the third output leg connected, and
   a plurality of output capacitors connected to the first three-phase inductive coil, the second three-phase inductive coil, and the third three-phase inductive coil; and
   a bridge capacitor and a control switching element connected between the charging circuit and the generating circuit.

2. The unitary on-board charger and generator of claim 1, wherein the three-phase inverting circuit includes a plurality of switching elements.

3. The unitary on-board charger and generator of claim 2, wherein the power factor correction converter includes a charging inductor coil, a charging solid-state switching element, a charging diode, and a mode switching element parallelly connected to the charging diode.

4. The unitary on-board charger and generator of claim 3 further comprising:
   a controller operable to:
   disengage the mode switching element and the control switching element;
   cycle the charging solid-state switching element at a predetermined frequency;
   disengage one or more of the plurality of switching elements; and
   control the bi-directional DC/DC converter to convert an AC energy received by the AC power source to a DC energy that is stored by the traction battery.

5. The unitary on-board charger and generator of claim 3 further comprising:
   a controller operable to:
   engage the control switching element;
   cycle the charging solid-state switching element, the mode switching element, and one or more of the plurality of switching elements to provide a predetermined charging voltage across the bridge capacitor; and
   in response to the predetermined charging voltage being supplied to the bridge capacitor: disengage the charging solid-state switching element and the mode switching element, cycle one or more of the plurality of switching elements, and control the bi-directional DC/DC converter to convert a DC energy stored by the traction battery to a single-phase AC energy or a split-phase AC energy supplied to one or more output loads.

6. The unitary on-board charger and generator of claim 3 further comprising:
   a controller operable to:
   disengage the mode switching element, charging solid-state switching element, and the control switching element,
   cycle one or more of the plurality of switching elements, and
   control the bi-directional DC/DC converter to convert a DC energy stored by the traction battery to a three-phase AC energy that is supplied to one or more output loads.

7. The unitary on-board charger and generator of claim 2, wherein the plurality of switching elements are IGBT transistors.

8. The unitary on-board charger and generator of claim 2, wherein the plurality of switching elements are MOSFET transistors.

9. The unitary on-board charger and generator of claim 3, wherein the charging solid-state switching element is a MOSFET transistor.

10. The unitary on-board charger and generator of claim 3, wherein the charging solid-state switching element is an IGBT transistor.

11. The unitary on-board charger and generator of claim 1, wherein the AC power source includes an electric vehicle supply equipment.

12. A unitary on-board charger and generator for an electric vehicle, comprising:
    a charging circuit including:
    a diode bridge rectifier connected to an AC power source,
    a power factor correction converter connected between the diode bridge rectifier and a filtering capacitor, and
    a bi-directional DC/DC converter connected between the filtering capacitor and a traction battery,
    a generating circuit including:
    an inverting circuit being connected to the filtering capacitor and the bi-directional DC/DC converter,
    one or more inductive coils connected between the inverting circuit and one or more output capacitors; and
    a bridge capacitor and a control switching element connected between the inverting circuit and filtering inductor at a first end and between the diode bridge rectifier and the power factor correction converter at a second end.

13. The unitary on-board charger and generator of claim 12, wherein the power factor correction converter includes a charging inductor coil, a charging solid-state switching element, a charging diode, and a mode switching element parallelly connected to the charging diode.

14. The unitary on-board charger and generator of claim 13, wherein the inverting circuit includes a first-phase output leg, a second-phase output leg, and a third-phase output leg.

15. The unitary on-board charger and generator of claim 14, wherein the one or more inductive coils includes a first three-phase inductive coil connected to the first-phase output leg, a second three-phase inductive coil connected to the second-phase output leg, and a third three-phase inductive coil connected to the third-phase output leg.

16. The unitary on-board charger and generator of claim 15, wherein the inverting circuit includes a plurality of switching elements.

17. The unitary on-board charger and generator of claim 16 further comprising:
    a controller operable to:
    disengage the mode switching element and the control switching element;
    cycle the charging solid-state switching element at a predetermined frequency;

disengage one or more of the plurality of switching elements; and control the bi-directional DC/DC converter to convert an AC energy received by the AC power source to a DC energy that is stored by the traction battery.

18. The unitary on-board charger and generator of claim 16 further comprising:

a controller operable to:

engage the control switching element;

cycle the charging solid-state switching element, the mode switching element, and one or more of the plurality of switching elements to provide a predetermined charging voltage across the bridge capacitor; and in response to the predetermined charging voltage being supplied to the bridge capacitor: disengage the charging solid-state switching element and the mode switching element, cycle one or more of the plurality of switching elements, and control the bi-directional DC/DC converter to convert a DC energy stored by the traction battery to a single-phase AC energy or a split-phase AC energy supplied to one or more output loads.

19. The unitary on-board charger and generator of claim 16 further comprising:

a controller operable to:

disengage the mode switching element, charging solid-state switching element, and the control switching element, cycle one or more of the plurality of switching elements, and control the bi-directional DC/DC converter to convert a DC energy stored by the traction battery to a three-phase AC energy that is supplied to one or more output loads.

20. A method of charging a traction battery for an electric vehicle and powering an output load connected to the electric vehicle, comprising:

in response to detecting that an AC energy is being supplied by an AC power source to a diode bridge rectifier:

disengaging a mode switching element connected between the one or more inverting circuit switching elements and the diode bridge rectifier, cycling a power factor correction converter at a predetermined frequency, disengaging a control switching element, wherein the mode switching element is parallelly connected to a charging diode included within the power factor correction converter, disengaging one or more inverting circuit switching elements, and controlling a bi-directional DC/DC converter to convert the AC energy received by the AC power source to a DC energy that is stored by the traction battery, in response to detecting the AC energy is not being supplied by the AC power source to the diode bridge and a single-phase load or a split-phase load being connected to the electric vehicle:

engaging the control switching element, cycling the mode switching element, a charging solid-state switching element within the power factor correction converter, and the one or more inverting circuit switching elements to provide a predetermined charging voltage across a bridge capacitor, wherein the bridge capacitor is connected between the one or more inverting circuit switching elements and the diode bridge rectifier, and disengaging the charging solid-state switching element and the mode switching element, and controlling the bi-directional DC/DC converter to convert the DC energy stored by the traction battery to a single-phase AC energy or split-phase AC energy, and in response to detecting the AC energy is not being supplied by the AC power source to the diode bridge and a three-phase load being connected to the electric vehicle:

disengaging the mode switching element, the charging solid-state switching element, and the control switching element, cycling the one or more inverting circuit switching elements, and controlling the bi-directional DC/DC converter to convert the DC energy stored by the traction battery to a three-phase AC energy.

* * * * *